United States Patent
Syrivelis et al.

(10) Patent No.: US 12,284,162 B2
(45) Date of Patent: Apr. 22, 2025

(54) SYSTEMS, METHODS, AND DEVICES FOR ENCRYPTED DATA TRANSFER USING A NIC AND DISTRIBUTED ROOT OF TRUST

(71) Applicant: MELLANOX TECHNOLOGIES, LTD., Yokneam (IL)

(72) Inventors: Dimitrios Syrivelis, Volos (GR); Dotan David Levi, Yokneam (IL); Paraskevas Bakopoulos, Ilion (GR); Ioannis (Giannis) Patronas, Athens (GR); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 113 days.

(21) Appl. No.: 17/369,305

(22) Filed: Jul. 7, 2021

(65) Prior Publication Data
US 2023/0006981 A1 Jan. 5, 2023

(30) Foreign Application Priority Data
Jul. 1, 2021 (GR) .............................. 20210100449

(51) Int. Cl.
*H04L 9/40* (2022.01)
*G06F 9/455* (2018.01)
*H04L 9/08* (2006.01)
*H04L 9/32* (2006.01)

(52) U.S. Cl.
CPC ...... *H04L 63/0435* (2013.01); *G06F 9/45533* (2013.01); *H04L 9/0819* (2013.01); *H04L 9/0852* (2013.01); *H04L 9/0894* (2013.01); *H04L 9/3265* (2013.01)

(58) Field of Classification Search
CPC . H04L 63/0435; H04L 9/0819; H04L 9/0852; H04L 9/0894; H04L 9/3265; H04L 63/061; G06F 9/45533
USPC ........................................................ 713/171
See application file for complete search history.

(56) References Cited

U.S. PATENT DOCUMENTS

| 9,774,401 | B1 * | 9/2017 | Borrill ................. H04L 9/0852 |
| 2009/0307474 | A1 * | 12/2009 | Johnston ........... H04W 12/0431 |
| | | | 713/168 |
| 2010/0318800 | A1 * | 12/2010 | Simon .................. H04L 9/0869 |
| | | | 713/171 |

(Continued)

FOREIGN PATENT DOCUMENTS

CN 112583583 3/2021

OTHER PUBLICATIONS

"AMD Secure Encrypted Virtualization (SEV)," Advanced Micro Devices, Inc., as of Jan. 22, 2021, 6 pages [developer.amd.com/sev].

(Continued)

*Primary Examiner* — Bryan F Wright
(74) *Attorney, Agent, or Firm* — Sheridan Ross P.C.

(57) ABSTRACT

A network interface controller includes processing circuitry configured to pair with a local root of trust of a host device connected to the network interface controller and provide a key to an encryption device of the host device that enables the encryption device to encrypt data of one or more host device applications using the key. The encrypted data are stored in host device memory. The processing circuitry is configured to share the key with a remote endpoint and forward the encrypted data from the host device memory to the remote endpoint.

20 Claims, 5 Drawing Sheets

(56) References Cited

U.S. PATENT DOCUMENTS

| | | | | |
|---|---|---|---|---|
| 2015/0178242 | A1* | 6/2015 | Snyder, II | G06F 9/45533 |
| | | | | 713/150 |
| 2016/0182499 | A1* | 6/2016 | Sharaga | G06F 21/82 |
| | | | | 713/156 |
| 2017/0078098 | A1* | 3/2017 | Marquardt | G06F 21/44 |
| 2018/0063103 | A1* | 3/2018 | Jahid | H04L 63/0807 |
| 2020/0220713 | A1* | 7/2020 | Li | H04L 9/14 |
| 2021/0157935 | A1* | 5/2021 | Sood | G06F 12/1009 |
| 2021/0226935 | A1* | 7/2021 | Mundt | H04L 63/0464 |
| 2022/0094535 | A1* | 3/2022 | Mentovich | H04L 9/0858 |

OTHER PUBLICATIONS

"AMD Memory Encryption," The kernel development community, as of Jan. 21, 2021, 3 pages [www.kernel.org/doc/html/latest/x86/amd-memory-encryption.html].

Kaplan et al. "AMD Memory Encryption," Advanced Mirco Devices, Inc., Apr. 21, 2016, White Paper, 12 pages.

Lei Huaiyu et al. "Research and Implementation of Wireless LAN Security Authentication System Based on EAP/TLS," Journal of Taiyuan University of Technology, Sep. 2005, vol. 36, No. 5, pp. 525-528 (English abstract).

Orangi et al. "An Activity-Based Use Trusting Behavor Diffusion Model in Social Networks," IEEE, 2018 9th International Symposium on Telecommunications (IST), Dec. 17-19, 2018, pp. 32-38.

Official Action with Machine Translation for China Patent Application No. 202210712794.9, dated Feb. 24, 2025, 24 pages.

\* cited by examiner

SYSTEMS, METHODS, AND DEVICES FOR ENCRYPTED DATA TRANSFER USING A NIC AND DISTRIBUTED ROOT OF TRUST

FIELD OF THE DISCLOSURE

The present disclosure is generally directed to systems, devices, and methods for encrypted data transfer.

BACKGROUND

Modern datacenters employ various devices and methods for high-speed data exchange that are vulnerable to malicious attacks, particularly when the data being exchanged is unencrypted.

BRIEF SUMMARY

In an illustrative embodiment, a network interface controller includes processing circuitry configured to pair with a local root of trust of a host device connected to the network interface controller and provide a key to an encryption device of the host device that enables the encryption device to encrypt data of one or more host device applications using the key. The encrypted data are stored in host device memory. The processing circuitry is configured to share the key with a remote endpoint and forward the encrypted data from the host device memory to the remote endpoint. Notably, the processing circuitry is not accessible to host device application software and so the key is not revealed to the one or more host device applications that use the encryption device.

In an illustrative embodiment, a method includes generating, by a network device connected to a host device, a key and associated key identifier, establishing, by the network device and over a communication network, a single key domain by sharing the key and the associated key identifier with at least one other network device, and performing a remote direct access memory (RDMA) operation within the single key domain to send data encrypted with the key over the communication network to the at least one other network device.

In an illustrative embodiment, a system includes a first host device, and a first network device coupled to the first host device. The first network device enables remote direct access memory (RDMA) operations for exchanging encrypted data over a communication network with a second host device. The encrypted data are encrypted with a single key.

Additional features and advantages are described herein and will be apparent from the following Description and the figures.

BRIEF DESCRIPTION OF THE DRAWINGS

The present disclosure is described in conjunction with the appended figures, which are not necessarily drawn to scale.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Inventive concepts relate to extensions of smart network interface controller (NIC) architectures that enable the exchange of in-memory encrypted buffers over Remote Direct Memory Access (RDMA) between endpoints without decrypting the data during the actual transfer. The approach aims to extend the data-in-use security concept for central processing units (CPUs) where data are not stored in the clear (e.g., unencrypted) in the main system memory but are encrypted by the CPUs during the store operation and are decrypted during the load (or read) operation so the contents of main system memory are always encrypted. Inventive concepts cover at least the following subsystem extensions: a smart NIC implementing the concept of a "distributed root of trust," which extends a local root of trust of a device attached to the NIC and allows authenticated machines to share keys through isolated/hardened NIC-based CPU complexes; details for the integration of quantum key distribution (QKD)-based secret key exchange; enabling a smart NIC to interact with the trusted root key management service on a server and negotiate the keys with the local applications, where the key(s) will then be used to exchange encrypted buffers over RDMA with a remote counterpart; and an introduction of host-isolated support to the NIC for the transfer of key-synchronization messages between endpoints that also acts as part of an RDMA tunnel establishment sequence.

The meltdown and spectre bugs that were introduced in 2018 shocked the cloud computing industry. In this type of attack, an adversary exploits a CPU side channel, combining speculative execution features along with cache hits on modern processors, that allowed a legitimate application to dump an entire operating system (OS) kernel in-memory footprint. The initial response to this type of attack was to disable speculative execution on processors, which decreased CPU performance substantially and, at the software-level, the OS kernel was appropriately patched to load itself to an arbitrary location at boot rather than a static one, which makes it very difficult, but not impossible, to interpret a memory dump.

However, these mitigation measures do not address the heart of the problem, which is that data-in-use (i.e., data stored on main system memory and cache on which CPUs work) are stored in main system memory in the clear (unencrypted). Even an encrypted disk block buffer is manipulated unencrypted by the CPU and at that point a substantial vulnerability is exposed. For that reason, CPU vendors have rolled or are soon rolling out CPUs with in-memory encryption capabilities. The basic functionality of encrypted memory support is that the CPU (or the memory controller) encrypts data on the fly as it stores data to memory and decrypts the data when the CPU loads the data back. As a result, the data stored in memory (after the lowest point of coherency) are always encrypted. CPUs employing encrypted memory support have different operating modes that may be classified in two main categories: transparent full memory encryption (where everything in memory is encrypted with the same key—referred to as Secure Memory Encryption), and a more elaborate scheme that allows each virtual machine or each container (or more generally, each process) to use custom keys for the memory in use. Since the memory contents are always encrypted, an illegal memory dump via a side channel has the additional challenge of breaking the symmetric key encryption (such AES) to read the data, which is currently intractable to solve. Even though CPU memory encryption engines strive for efficiency, these encryption engines introduce some amount of latency and consume significant power.

In the CPU encrypted memory support, the encryption engine operates on cache line-sized blocks and is engaged in the memory access data path on a per cache line-update transaction basis. Dedicated reserved bits of each transaction's virtual address define whether the transaction payload should undergo an encryption or decryption (depending on whether the operation is a store or load operation). In that context, DMA engines of peripherals (like smart NICs) may be programmed by a driver to read or write application buffers with encryption support on or off. If the encryption support is turned off, the peripheral will read the application buffer encrypted and does not have the key to decipher.

Inventive concepts relate to cases where two or more remote servers have enabled the CPU memory encryption, which creates secure memory enclaves that allow the use of different keys for each application or that allow the use of a single key for multiple applications, and that run applications that perform RDMA transfers between them. Inventive concepts create an isolated, secure, single encryption key domain that integrates the data-in-use security of each server endpoint with data-in-motion introduced by RDMA between servers for two or more applications on different servers that want to exchange data.

The benefits of using a single key domain between applications that leverage secure memory enclaves that also need to exchange data over RDMA include: the NIC will have RDMA payload encrypted for free and does not need to leverage additional encryption support, thus consuming less power while still transferring encrypted data; CPU-based encryption is not in the critical path of the transfer and happens sometime beforehand, which enables the RDMA to use a low latency data path that does not go through the encryption offloading accelerators while still carrying symmetrically encrypted payloads; payload data sent to the NIC remain encrypted, which further resists tampering attempts with the peripheral component interconnect express (PCIe) bus or NIC internals where, otherwise, the transferred data would have been unencrypted; and, even if the NIC, for security reasons (e.g., more frequent key updates, stronger ciphers, encryption of the Layer3 and Layer2 headers), needs to encrypt packets, the described approach is still beneficial as it eliminates the need of encryption/decryption of the buffers at the processor-level, as the buffers are transferred encrypted, which contributes to lower latency and decreased power consumption.

In some cases, there are multiple protection domains inside a single CPU, and the NIC is the only entity entitled to read/write data from all domains to secure the protection domains. This allows inventive concepts to apply to cases where the authority for the encryption is a guest virtual machine (VM), and the NIC serves multiple guest VMs.

In general, inventive concepts relate to assignment of a root of trust to a NIC's programmable system on chip (SoC) and integration of the NIC root of trust with a local server root of trust and CPU firmware to form a distributed root of trust (e.g., some root of trust functions are performed by the local root of trust of the server and some root of trust functions are performed by the root of trust on the NIC). In this context, the NIC becomes an isolated key distributor that securely provides keys to applications running on hosts. The NIC may also provide isolated key distribution to several different clients (e.g., VMs) on the same host while providing a secure domain for data-in-use and data-in-motion with a single encryption key. Inventive concepts further relate to a bring-up sequence of a secure domain for data-in-use and data-in-motion for applications that run on systems with encrypted memory support and that perform RDMA transfers, and the integration of Quantum Key distribution (QKD) with the aforementioned key distribution scheme.

The approach of a single key domain between data-in-use and data-in-motion has not been yet considered because the approach is primarily applicable to RDMA or custom Data Plane Development Kit (DPDK) solutions where the NIC is not required to read any data on the network buffer to proceed with the packet forwarding, as the data comes from the main system memory already encrypted.

Inventive concepts propose a distributed root of trust for secret key management that features appropriately integrated endpoints on each server host. The distributed root of trust support on each server is provided by a NIC at each server that is hardened and isolated from user applications. Subsequently, each NIC root of trust may provide the local server with encryption keys via isolated channels that are used by the hardware-enabled (e.g., CPU/memory controller) encrypted memory support. Host processor firmware handles the integration of the NIC provided root of trust with the local encrypted memory root of trust to form the distributed root of trust. The system may be leveraged by a hypervisor or application loader that runs on each server with hypervisor privileges and handles of the synchronization steps between two or more servers, thereby enabling the same encryption key to be used by all the applications that wish to establish an RDMA channel. Once coordination is completed, the hypervisor/loader on each server forks the application binaries (e.g., virtual machines) to set the same key for the local secure memory enclaves.

Figure 1:
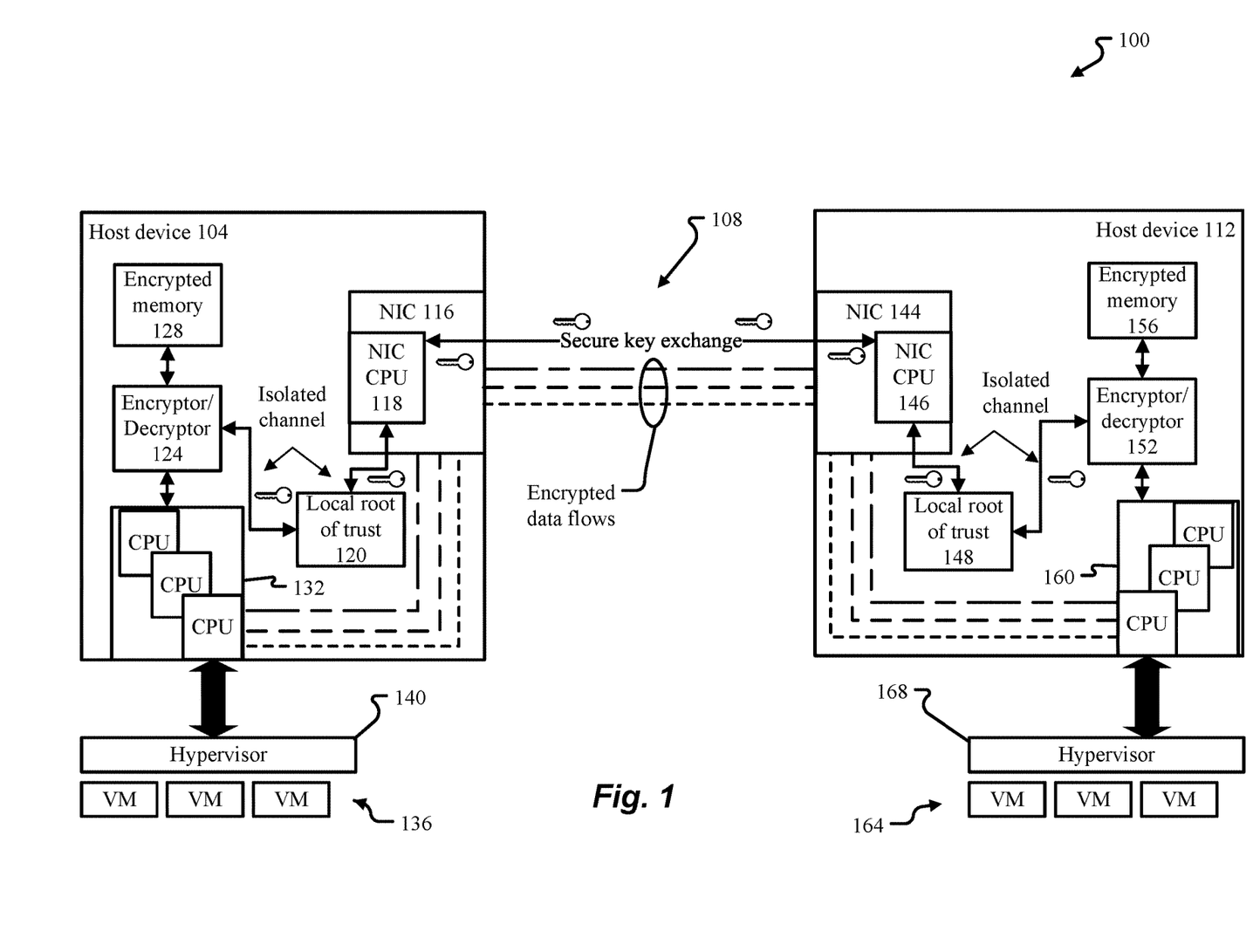
FIG. 1 illustrates a system according to at least one example embodiment.
Figure 2:
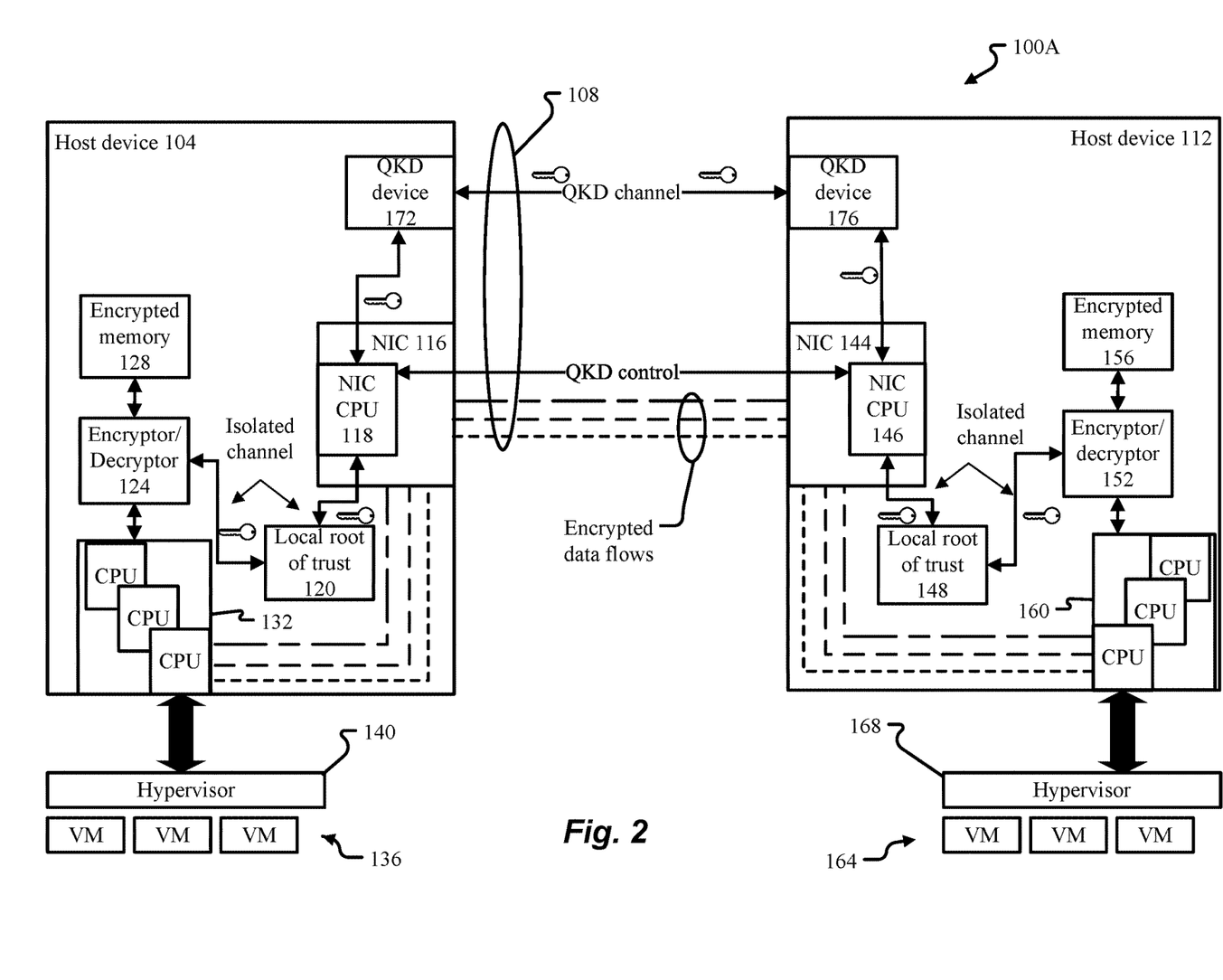
FIG. 2 illustrates a system according to at least one example embodiment.

Example embodiments cover at least: 1) the distributed root of trust NIC-assisted concept; and 2) the formation of a single secret key domain between one or more applications, that run on different machines and use RDMA to exchange data. An example deployment for a setup with two servers is depicted in FIGS. 1 and 2.

Some NICs feature an entire processor complex that, in selected configurations, can be entirely isolated from the attached host device and can be controlled from an infrastructure provider via a dedicated network port. In that context, even if for example a datacenter infrastructure provider provides bare metal server access to a third party, the provider still has thorough control of the network-facing traffic by leveraging the CPU complex on the NIC because the CPU complex is completely isolated from the host device software. Example embodiments build on the concept of an isolated, infrastructure provider-controlled, CPU complex on a NIC to introduce a distributed root of trust service, which allows secret keys to be securely agreed upon and shared between remote machines via each remote machine's local root of trust support.

A local root of trust (e.g., an Advanced RISC Machines (ARM) trusted boot) on computing systems is a hardware-assisted entity that allows running system software to secure the identity of the platform on which the software is running. This prevents adversaries from taking over the control of a system at a very low-level, for example, by preventing boot of a malicious OS kernel or by preventing emulation of the host to trick the software into running on an adversary-controlled execution environment (enclave). With the advent of hardware memory encryption, the root of trust role has been extended to provide secret keys via an out-of-band channel to the encryptor/decryptor hardware that performs the cryptography operations in a controlled manner. In addition, there is a secure interface with the OS and hypervisor to control which keys are used for which secure execution environments (e.g., VMs). A local root of trust is, in most cases, a CPU-based system that is physically isolated from the network and controlled by server firmware (e.g., Basic-Input Output System (BIOS)) to which the root of trust also provides security bootstrap services. Thus, software that runs on a system is forced to interact with the server firmware to access the very specific, well-defined root of trust services.

Inventive concepts relate to an approach for adding the functionality of key exchange to the local root of trust by offloading the network part of the tasks to a trusted root of trust service that runs on the NIC, for example, on the NIC's CPU complex. Each time a NIC is attached to the PCI-bus or other peripheral interconnect infrastructure of a system (e.g., a server), the system administrator may carry out a pairing process between the extended root of trust service running on the NIC's CPU complex and the local root of trust of the system or server. The pairing process may include generating a combined root certificate that uniquely defines the specific server platform instance with the specific instance of the attached NIC. Thereafter, the server interconnect access to the NIC CPU complex is physically confined to be carried out by circuitry that can only be controlled by the server local root of trust and/or the server firmware. The NIC CPU complex runs a process that acts as part of the root of trust firmware and provides a service for secure key exchange with remote counterparts (e.g., other NICs) by, leveraging the network access facilities of the NIC. The NIC-based distributed root of trust endpoint may then form secure connections to other root of trust endpoints within the datacenter or beyond to exchange keys. Key exchange may be performed with any secure tunnel approach like VPN and MACsec. At least one example embodiment performs the key-exchange over a Quantum-key distribution system (QKD). In addition, the NIC-based distributed root of trust assists with the secure notification of key exchange completion (e.g., to the hypervisor) so that a single secret key domain is formed.

A distributed root of trust according to example embodiments may implement the following operations for a key exchange: 1) the administrator has configured a centralized service like DNS or has a hardcoded list of server identifiers available to the root of trust service extension that runs on the NIC to identify one or more remote endpoints that wish to participate in a single key domain, 2) a hypervisor establishes an isolated channel with the local server firmware that is dedicated, secured and cannot be overridden; 3) the local root of trust receives a request from the hypervisor over the isolation channel via a firmware callback to set up a single key domain with the one or more remote endpoints; 4) the local root of trust authenticates and relays the request to the NIC-based root of trust extension via the isolated channel (for example, the NIC root of trust service uses a backend to generate a secret key-key identifier keyID (e.g., a universally unique identifier (UUID)) pair and then securely exchanges the key with the remote endpoint(s). Upon completion of key sharing, the key identifier keyID is returned to the local server firmware (e.g., the local root of trust) and from there to hypervisor for future reference; 5) upon return of the KeyID, the hypervisor knows that the key exchange has been carried out and the secret key can be made available to the encrypted memory engines of remote endpoints upon request; 6) during launch of an application, the keyID is passed as an argument by the hypervisor so the hypervisor's virtual address space can be associated with the secret key to which keyID points (by using the keyID, the secret key that is actually being used for in-memory data encryption is never revealed which is consistent with how encrypted memory operates), and upon the first request for keyID installation, the keyID-key pair is consumed and cannot be used again.

The secure exchange of the keyID may be a hypervisor responsibility. Nevertheless, there is some inherent security in place in case such a communication channel is compromised. Firstly, eavesdropping the keyID cannot be used to decrypt data as the keyID is only a reference to the actual secret key which is not revealed to any applications. In addition, a side channel cannot be established as the system removes the key-keyID pair after the key-keyID pair has been requested exactly once. Therefore, the key can be either consumed by the launch of the actual application or the side channel application, and hence, no eavesdropping can be established.

Regarding the actual key exchange, the system can support existing good practices but, in addition, may be based on Quantum Key Distribution (QKD). In the QKD case, the key-keyID pair approach is compatible with existing QKD devices. Therefore, the KeyID exchange is integrated in the described root of trust flow in the same spirit whereas the key exchange is performed from the QKD quantum channel making the whole key exchange process quantum safe.

As described above and below, the distributed root of trust according to example embodiments enables the secret key exchange between remote machines in a coordinated fashion. Given that RDMA communication is integrated in the virtual address space of applications to bypass the CPU entirely and given that the RDMA buffer contents do not have to be read by the MC for forwarding operations as all the network plumbing happens out-of-band, there is the unique opportunity to move around encrypted memory contents without actually having to decrypt the contents for the network transfer. For this to work, the endpoints that exchange encrypted memory contents over RDMA should be using the same key. The distributed root of trust support according to example embodiments provides this functionality and includes the integration of RDMA initialization sequence with distributed root of trust functionality for performing RDMA between encrypted memory systems.

The RDMA initialization sequence may include the following operations. Firstly, RDMA orchestration software is notified that virtual machines (VMs) or containers or specific processes (in the case of high performance computing (HPC)) will start on specific servers with encrypted memory turned on and will be also performing RDMA. Subsequently, the orchestration software informs the hypervisor on each machine, in addition to the default details required to launch applications, that encrypted memory support will be activated and the machines will participate to a single secret key domain. A specific hypervisor is designated as the key domain master for the purpose of initiating the distributed root of trust key exchange. Upon notification of established single key domain (i.e., the agreed secret key has been exchanged and is locally available on each endpoint), the required application instances may be started on each server. Given that the keys are the same, the encrypted content that originates from the virtual address space of one application endpoint should be readable by any remote counterpart without the need for any decryption during the network transfer. After proper launch as described above, the standard RDMA approach may be used both for channel setup as well as data exchange.

The above initialization approach is not limited to any specific orchestrator or hypervisor or virtualization technology. The steps of leveraging the NIC-assisted distributed root of trust to bring up a single secret key domain for encrypted memory systems may be accomplished by a custom bootstrap process in any suitable application scenario. One hard requirement is that the NIC should not rely on packet information that has been added by applications (e.g., as it can happen with DPDK applications) that use encrypted memory for forwarding operations, as the packet information is not part of the secret key domain and the data are encrypted.

The above-described systems, methods, and devices will now be explained with reference to FIGS. 1-5.

FIG. 1 illustrates a system 100 according to at least one example embodiment. The system 100 includes a host device 104, a communication network 108, and a host device 112. In at least one example embodiment, host devices 104 and 112 correspond to one or more of a Personal Computer (PC), a laptop, a tablet, a smartphone, a server, a collection of servers, or the like. In some embodiments, the host devices 104 and 112 may correspond to any appropriate type of device that communicates with other devices also connected to a common type of communication network 108. As another specific but non-limiting example, the host devices 104 and 112 may correspond to network switches for servers offering information resources, services and/or applications to user devices, client devices, or other hosts in the system 100.

Examples of the communication network 108 that may be used to connect the host devices 104 and 112 include an Internet Protocol (IP) network, an Ethernet network, an InfiniBand (TB) network, a Fibre Channel network, the Internet, a cellular communication network, a wireless communication network, combinations thereof (e.g., Fibre Channel over Ethernet), variants thereof, and/or the like. In one specific, but non-limiting example, the communication network 108 enables data transmission between the devices 104 and 112 using optical signals. In this case, the host devices 104 and 112 and the communication network 108 may include waveguides (e.g., optical fibers) that carry the optical signals. In one specific, but non-limiting example, the communication network 108 enables data transmission between the host devices 104 and 112 using electrical signals. In this case, the host devices 104 and 112 and the communication network 108 may include conductive wires (e.g., copper wires) that carry the electrical signals. In one embodiment, the communication network 108 enables data transmission with both electrical and optical signals.

The host device 104 includes an attachable network device (also called a network attached device), such as a network interface controller (NIC) 116 or other suitable network attached device. The host device 104 includes a local root of trust 120, an encryptor/decryptor 124, encrypted memory 128, and a collection of central processing units (CPUs) 132.

The NIC 116 may be a "smart" NIC that includes a CPU complex with at least one CPU 118. The CPU 118 may include processing circuitry and/or memory for carrying out computing tasks, for example, tasks associated with controlling the flow of data over the communication network 108. The processing circuitry may comprise software, hardware, or a combination thereof. For example, the processing circuitry may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry may comprise hardware, such as an application specific integrated circuit (ASIC). Other non-limiting examples of the processing circuitry include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry may be provided on a Printed Circuit Board (PCB) or collection of PCBs. It should be appreciated that any appropriate type of electrical component or collection of electrical components may be suitable for inclusion in the processing circuitry. As discussed in more detail below, the CPU 118 enables creation of a single-key domain for exchanging encrypted data with host device 112. To this end, the CPU 118 may execute isolated root of trust software (e.g., firmware) to extend the local root of trust 120 to form a distributed root of trust between the CPU 118 and the local root of trust 120.

The local root of trust 120 comprises suitable hardware and/or software for enabling secure communication with other elements of the host device 104 and is trusted by the operating system (OS) of the host device 104. The local root of trust 120 (e.g., an Advanced RISC Machines (ARM) trusted boot) may be a hardware-assisted entity that allows running system software to secure the identity of the platform on which the software is running. This prevents adversaries from taking over the control of a system at a very low-level, for example, by preventing boot of a malicious operating system kernel or by preventing emulation of the host to trick the software into running on an adversary-controlled execution environment (enclave). With the advent of hardware memory encryption, the root of trust role has been extended to provide secret keys via an out-of-band channel to the encryptor/decryptor 124 hardware that performs the cryptography operations in a controlled manner. In addition, there is a secure interface with the OS and hypervisor 140 to control which keys are used for which secure execution environments (e.g., VMs). The local root of trust 120 may include a CPU-based system that is physically isolated from the communication network 108 and controlled by firmware of the host device 104 (e.g., Basic-Input Output System (BIOS) firmware) to which the root of trust also provides security bootstrap services. Thus, software that runs on the host device 104 interacts with the host device 104 firmware to access specific, well-defined root of trust services.

In at least one embodiment, the local root of trust 120 enables data encryption functions, detection and reporting of unauthorized changes to the OS or applications, detection of rootkits, memory curtaining, and/or digital rights management. As discussed in more detail below, the local root of trust 120 pairs with a root of trust of the CPU 118 (also referred to as an extended root of trust) to provide a distributed root of trust for the host device 104.

The encryptor/decryptor 124 includes suitable hardware and/or software for encrypting data and storing the encrypted data on encrypted memory 128. The encryptor/decryptor 124 may further include suitable hardware and/or software for decrypting the data from encrypted memory 128. The encryptor/decryptor 124 may encrypt data from the CPUs 132 using a key received from the local root of trust 120 over an isolated (secure) channel. The encrypted memory 128 may include volatile and/or non-volatile storage devices. Non-limiting examples of suitable memory devices for the encrypted memory 128 include flash memory, Random Access Memory (RAM), variants thereof, combinations thereof, or the like. The encrypted memory 128 may be main system memory of the host device 104 (as in FIG. 1), peripheral device dedicated memory (e.g., GPU memory), encrypted storage (e.g., NVMe Over Fabric), and/or storage class memory.

The collection of CPUs 132 may include the same or similar processing circuitry as the CPU 118. In one embodiment, the CPUs 132 include physical and/or logical processing units that execute operations for a respective virtual machine (VM) in a collection of VMs 136 created by a hypervisor 140. The CPUs 132 and VMs 136 may be controlled by the hypervisor 140.

The host device 112 includes an attached network device (also called a network attached device), such as a NIC 144, or other suitable network attached device. The host device 112 further includes a local root of trust 148, an encryptor/decryptor 152, encrypted memory 156, and a collection of central processing units (CPUs) 160.

The NIC 144 may be a "smart" NIC that includes a (CPU) complex with at least one CPU 146. The CPU 146 may include the same or similar processing circuitry as CPU 118. As discussed in more detail below, the CPU 146 (along with CPU 118) enables a single-key domain for exchanging encrypted data with host device 104. To this end, the CPU 146 may execute isolated root of trust software (e.g., firmware) to extend the local root of trust 148 to form a distributed root of trust between the CPU 146 and the local root of trust 148. As shown in FIG. 1, the secure key exchange may occur over a designated, secure channel between CPUs 118 and 146. However, it should be appreciated that one or more control signals for key exchange may be exchanged over a backend channel.

Like the local root of trust 120 of host device 104, the local root of trust 148 comprises suitable hardware and/or software for enabling secure communication with other elements of the host device 112 and is trusted by the operating system (OS) of the host device 112. For example, the local root of trust 148 (e.g., an Advanced RISC Machines (ARM) trusted boot) may be a hardware-assisted entity that allows running system software to secure the identity of the platform on which the software is running. This prevents adversaries from taking over the control of a system at a very low-level, for example, by preventing boot of a malicious operating system kernel or by preventing emulation of the host to trick the software into running on an adversary-controlled execution environment (enclave). With the advent of hardware memory encryption, the root of trust role has been extended to provide secret keys via an out-of-band channel to the encryptor/decryptor 152 hardware that performs the cryptography operations in a controlled manner. In addition, there is a secure interface with the OS and hypervisor 168 to control which keys are used for which secure execution environments (e.g., VMs). The local root of trust 148 may include a CPU-based system that is physically isolated from the communication network 108 and controlled by firmware of the host device 112 (e.g., Basic-Input Output System (BIOS) firmware) to which the root of trust also provides security bootstrap services. Thus, software that runs on the host device 112 interacts with the host device 112 firmware to access specific, well-defined root of trust services.

In at least one embodiment, the local root of trust 148 enables data encryption functions, detection and reporting of unauthorized changes to the OS or applications, detection of rootkits, memory curtaining, and/or digital rights management. As discussed in more detail below, the local root of trust 148 pairs with a root of trust of the CPU 146 to provide a distributed root of trust for the host device 112.

The encryptor/decryptor 152 includes suitable hardware and/or software for encrypting data and storing the encrypted data on encrypted memory 156. The encryptor/decryptor 152 may further include suitable hardware and/or software for decrypting the data in encrypted memory 156. The encryptor/decryptor 152 may encrypt data from the CPUs 160 using a key received from the local root of trust 148 over an isolated (secure) channel. The encrypted memory 156 may include volatile and/or non-volatile storage devices. Non-limiting examples of suitable memory devices for the encrypted memory 156 include flash memory, Random Access Memory (RAM), variants thereof, combinations thereof, or the like. The encrypted memory 156 may be main system memory of the host device 104 (as in FIG. 1), peripheral device dedicated memory (e.g., GPU memory), encrypted storage (e.g., NVMe Over Fabric), and/or storage class memory.

The collection of CPUs 160 may include the same or similar processing circuitry as the CPU 118. In one embodiment, the CPUs 132 include physical and/or logical processing units that execute operations for a respective virtual machine (VM) in a collection of VMs 164 created by a hypervisor 168. The CPUs 160 and VMs 164 may be controlled by the hypervisor 168.

Here, it should be appreciated that although various elements of the system 100 are illustrated as separate entities, some elements may be integrated with one another within the system 100. In addition, although not explicitly shown, it should be appreciated that host devices 104 and 112 may include other processing devices, storage devices, and/or communication interfaces generally associated with computing tasks, such as sending and receiving data. The system 100 may also include additional host devices with substantially the same structure as host devices 104 and 112.

As shown in FIG. 1, the NICs 116 and 144 enable secure key exchange between them by, for example, the CPUs 118 and 146 executing securely stored key exchange software stored thereon. Some key exchange operations, such as, operations for controlling the key exchange and/or the exchange of the actual key may occur over a secure backend channel between the CPUs 118 and 146.

Here, it should be appreciated that host devices 104 and 112 have encrypted memory support. In other words, the data stored in memories 128 and 156 (e.g., after the lowest point of coherency) are always encrypted. Encrypted memory support has different operating modes that may be classified in two main categories: transparent full memory encryption (where everything in memories 128 and 156 is encrypted with the same key—referred to as Secure Memory Encryption); and a scheme that allows each virtual machine or each container (or more generally, each process) to use custom keys for the data in use. Since the memory contents are always encrypted, an illegal memory dump via a side channel has the additional challenge of breaking the symmetric key encryption (such AES) to read the data, which is intractable to solve.

Inventive concepts relate to cases where the host devices 104 and 112 have enabled memory encryption support, which creates secure memory enclaves that allow the use of different keys (or the same key) for each application. The host devices 104 and 112 may run applications that perform RDMA transfers across the communication network 108. In operation, the system 100 creates an isolated, secure, single encryption key domain that integrates the data-in-use security (i.e., data in memories 128 and 156) of each host device 104 and 112 with data-in-motion introduced by RDMA between host devices 104 and 112 for two or more applications that want to exchange data. For example, FIG. 1 illustrates encrypted data flows between host devices 104 and 112 where the encrypted data flows may correspond to encrypted RDMA transfers of data. Notably, the data remains encrypted throughout the RDMA transfer without being decrypted. In o As discussed in more detail below, the system 100 enables a single key domain between applications of the host devices 104 and 112 that leverage secure memory enclaves that also need to exchange data over RDMA include. Each NIC 116 and 144 has an RDMA payload encrypted for free and does not need to provide additional encryption support, thus consuming less power while still transferring encrypted data.

In general, inventive concepts relate to assignment of a root of trust to the NIC CPUs 118 and 146 (e.g., with specific hardware and/or software) and integration of each NIC root of trust 120 and 148 with respective local roots of trust 120 and 148 to form a distributed root of trust that enables the NICs 116 and 144 to exchange keys to, for example, carry out encrypted RDMA operations between host devices 104 and 112. In this context, each NIC 116 and 144 functions as an isolated key distributor that securely provides keys to applications running on host devices 104 and 112. Each NIC 116 and 144 may also provide isolated key distribution to several different clients (e.g., VMs) on the same host while providing a secure domain for data-in-use (e.g., data in memory) and data-in-motion (e.g., data being transferred) with a single encryption key. As discussed in more detail below, inventive concepts further relate to a bring-up sequence of a secure domain for data-in-use and data-in-motion for applications that run on systems with encrypted memory support and that perform RDMA transfers, and the integration of Quantum Key distribution (QKD) with the aforementioned key distribution scheme.

The distributed root of trust for secret key management features appropriately integrated endpoints on each host device 104 and 112. For example, the distributed root of trust support on each host device 104 and 112 is provided by the NIC 116 and 144 and is hardened and isolated from user applications (e.g., VMs 136 and 164). Subsequently, each distributed root of trust (provides its host device 104 and 112 with encryption keys via isolated channels that are used by the hardware-enabled encrypted memory support devices (e.g., encryptor/decryptor devices 124 and 152). Host device firmware handles the integration of each NIC provided root of trust with the respective local root of trust. The system 100 is leveraged by hypervisors 140 and 168 (or by application loaders that run on each host device 104 and 112 with hypervisor privileges) that handle the synchronization steps between the host devices 104 and 112, thereby enabling the same memory encryption key to be used by the applications that wish to establish an RDMA channel. Once coordination is completed, the hypervisor or loader on each host device 104/112 forks the application binaries (e.g., VMs 136/164) to set the same key for the local secure memory enclaves 128 and 156.

Here, it should be appreciated that key exchange in FIG. 1 may be performed with a suitable key exchange protocol, such as internet key exchange (IKE), MACsec, IPsec, virtual private network (VPN), and/or a suitable secure tunnel approach.

FIG. 2 illustrates a system 100A according to at least one example embodiment. The system 100A is substantially the same as system 100 in FIG. 1 except that system 100A includes dedicated QKD devices 172 and 176 and a dedicated QKD channel (e.g., optical fiber(s)). The QKD devices 172 and 176 and QKD channel may include suitable hardware and/or software for accomplishing the same key exchange concept in FIG. 1 by exchanging keys according to suitable QKD methods and protocols. As shown in FIG. 2, the system 100A may further include a QKD control channel between CPU 118 and CPU 146 for passing control signals related to QKD key exchange. For example, the QKD control channel may use in-band communication to pass control signals. In addition, the QKD control channel may also carry the key identifier while the QKD channel between QKD devices 172 and 176 is an isolated channel used to exchange the actual key associated with the key identifier.

Example embodiments provide at least the following: 1) the distributed root of trust NIC-assisted concept; and 2) the formation of a single secret key domain between one or more applications that run on different virtual machines and use RDMA to exchange data.

Figure 3:
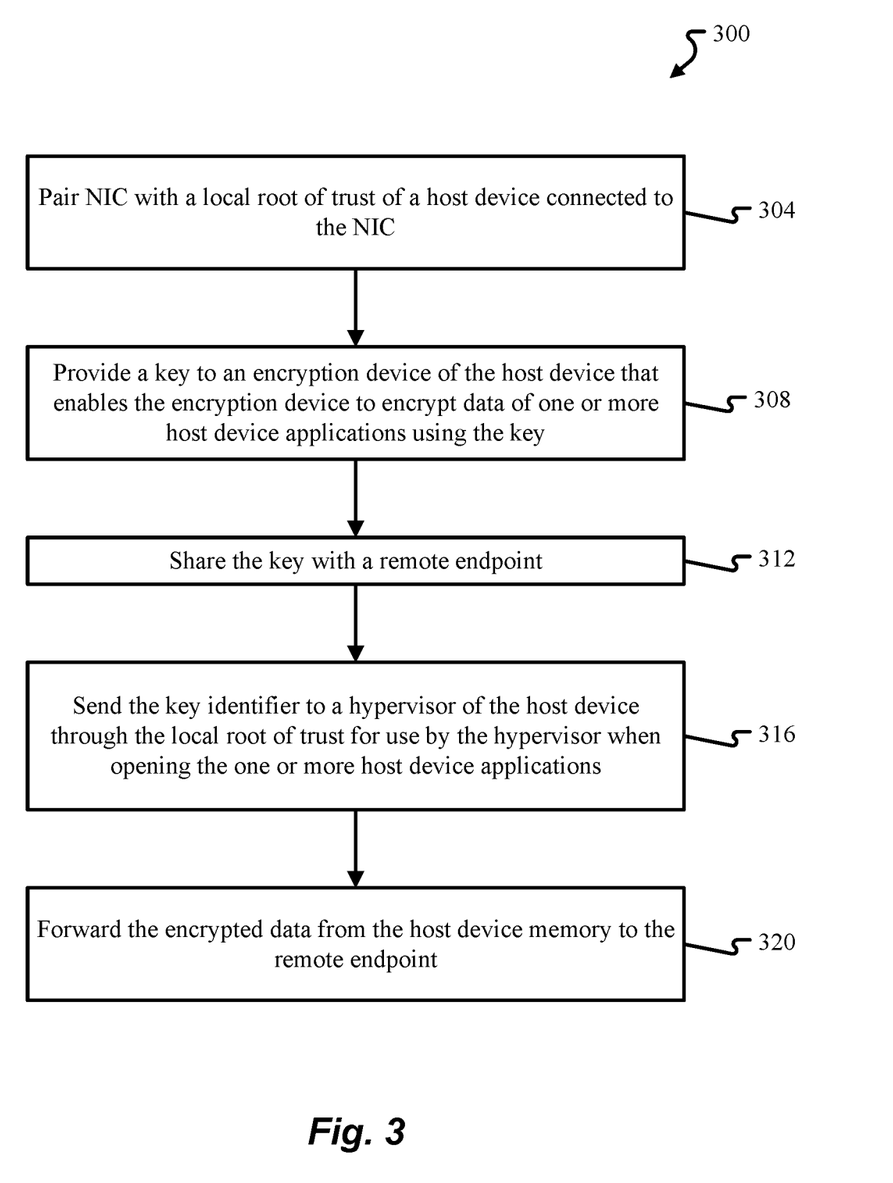
FIG. 3 illustrates a flowchart for a method according to at least one example embodiment.

FIG. 3 illustrates a method 300 according to at least one example embodiment. The method 300 may be carried out by one or more elements shown and described with reference to FIGS. 1 and 2. The operations of FIG. 3 are described with reference to the host device 104, but the operations of FIG. 3 may be equally carried out on host device 112 or any other host device of the systems 100 and/or 100A. The operations of FIG. 3 may relate to the formation of a distributed root of trust in a host device to create a key that encrypts data stored in encrypted memory 128, where that key is shared with a remote endpoint to enable encrypted data transfer operations.

Example embodiments relate to an approach for adding the functionality of key exchange to the local root of trust of a host device by offloading the network part of the tasks to a root of trust service that runs on a NIC, for example, on a NIC's CPU complex. Thus, operation 304 may include pairing a NIC root of trust (e.g., the root of trust service programmed on CPU 118) with a local root of trust 120 of the host device 104 connected to the NIC 116 to form a distributed root of trust that is distributed across the local root of trust 120 and the extended root of trust services of CPU 118. The pairing process may occur each time NIC 116 is connected to a PCI-bus or other peripheral interconnect system of the host device 104 or upon the MC 116 receiving an instruction to pair with the host device 104.

The pairing process in operation 304 may include generating a combined root certificate that uniquely defines the specific host device 104 platform instance with the specific instance of the attached NIC 116. Thereafter, the host device 104 access to the NIC CPU 118 is physically confined to be carried out by circuitry that can only be controlled by the local root of trust 120 and/or firmware of the host device 104. As part of the pairing process, the CPU 118 runs a process that functions as part of the local root of trust firmware to provide a service for secure key exchange with remote counterparts (e.g., other NICs like NIC 144) by leveraging the network access functions of the NIC 116. Thereafter, the NIC-based distributed root of trust at host device 104 is ready to form secure connections to other root of trust endpoints (e.g., the distributed root of trust of host device 112) within the datacenter or beyond to exchange keys.

Operation 308 includes providing the key to an encryption device of the host device 104 to enable the encryption device to encrypt data of one or more host device applications. For example, the CPU 118 provides the key to the encryptor/decryptor 124 via an isolated channel that passes through the local root of trust 120. Prior to providing the key to the encryptor/decryptor 124, the NIC 116 (or suitable similar network device) may generate the key and an associated key identifier. For example, the CPU 118 includes a random generator that generates a key (e.g., a unique key) and an associated universally unique identifier (UUID) for the key. As discussed in more detail below, the key identifier may be useful because discovering the key identifier does not reveal the key. The encryptor/decryptor 124 may use the key to encrypt data of the one or more host device applications. The one or more host device applications may include applications executed by the VMs 136.

Operation 312 includes sharing the key with a remote endpoint. For example, the CPU 118 shares the key with the CPU 146 of NIC 144 within host device 112 according to a suitable key sharing technique, which may include backend communication. For example, key exchange may be performed with a suitable secure tunnel approach like VPN, IKE, MACsec, and/or the like. At least one example embodiment performs the key-exchange over a Quantum-key distribution system (QKD), as in FIG. 2. In order to identify the host device 112 as a remote endpoint, the administrator of the system 100 and/or 100A may have a centralized service (e.g., domain name system (DNS)) or maintain a hardcoded list of host device identifiers that are available to the distributed root of trust formed in operation 304.

In at least one example embodiment, operation 312 includes the hypervisor 140 establishing an isolated channel with firmware that is dedicated and secure (i.e., the firmware cannot be overridden). The local root of trust 120 may receive a request from the hypervisor 140 via a firmware callback to set up a single key domain with one or more endpoints, such as, the host device 112 (see FIG. 5). The local root of trust 120 may then authenticate the request and relay the request to the distributed root of trust within the NIC 116 via the isolated channel. The root of trust on the NIC may use a backend to generate the key and associated key identifier pair and to securely exchange the key (and in some cases the key identifier) with the one or more remote endpoints.

Operation 316 includes sending the key identifier associated with the key to the hypervisor 140 through the local root of trust 120 for use by the hypervisor 140 when opening the one or more host device applications. For example, upon completion of key exchange, the distributed root of trust at host device 104 securely notifies the hypervisor 140 of key exchange completion, thereby forming a single secret key domain between the host device 104 and any endpoint that participated in the secure key exchange. In addition, returning the key identifier to the hypervisor 140 notifies the hypervisor 140 that the key may be made available to encrypted memory engines of the one or more remote endpoints upon request. In at least one example embodiment, the key identifier is passed as an argument by the hypervisor 140 during the launch of an application so that a portion of the hypervisor's virtual address space is associated with the key. By using the key identifier instead of the key, the key used for encryption is not revealed. Upon request for installation of a particular key identifier, the particular key identifier and associated key are marked as consumed so as to not be reused. At this stage, the host device 104 has established a single key domain with one or more endpoints (e.g., host device 112) in order to exchange encrypted data via, for example, RDMA.

Operation 320 includes forwarding the encrypted data of the one or more host device applications from the host device memory (e.g., encrypted memory 128) to a remote endpoint. For example, the system 100 and/or 100A may execute an RDMA operation to transfer encrypted data from host device 104 to host device 112 without decrypting the data at any point during the transfer. Here, it should be appreciated that forwarding the encrypted data may include the NIC 116 passing the encrypted data from the collection of CPUs 132 to the communication network 108 without performing any additional operations on the data such as data decryption or further data encryption.

An RDMA initialization sequence for operation 320 may include the following operations. Firstly, RDMA orchestration software (e.g., running on the host device 104) is notified (e.g., by the host device 104) that VMs (e.g., VMs 136 and 164) or containers or specific processes (in the case of high performance computing (HPC)) will start on specific host devices (e.g., host devices 104 and 112) with encrypted memory turned on and will be also performing RDMA. Subsequently, the RDMA orchestration software informs the hypervisor on each host device about the details used to launch host device applications, that encrypted memory support is activated, and that the host devices will participate to a single secret key domain. A specific hypervisor (e.g., hypervisor 140) may designated as the key domain master for the purpose of initiating the distributed root of trust key exchange. Upon notification of established single key domain (i.e., the agreed secret key has been exchanged and is locally available on each endpoint), the host device application instances may be started on each host device 104 and 112. Given that the keys at each endpoint are the same, the encrypted content that originates from the virtual address space of one application endpoint is readable by any remote counterpart without the need for any decryption during the network transfer. After proper launch as described above, a standard RDMA approach may be used both for channel setup as well as data exchange.

The above-described RDMA initialization approach is not limited to any specific orchestrator or hypervisor or virtualization technology. The steps of leveraging the NIC-assisted distributed root of trust to bring up a single secret key domain for encrypted memory systems may be accomplished by a custom bootstrap process in any suitable application scenario. However, the NIC should not rely on packet information that has been added by host device applications (e.g., as it can happen with DPDK applications) that use encrypted memory for forwarding operations, as the packet information is not part of the secret key domain and the data are encrypted.

Here, it should be appreciated that example embodiments provide for using a single key to encrypt data belonging to multiple different host device applications. In this case, the single key domain refers to using a single key to encrypt data for multiple host device applications. However, example embodiments also provide for using a separate key for each host device application that wishes to participate in encrypted data exchange. In this case, the single key domain refers to using a single key to encrypt data for a single host device application.

Figure 4:
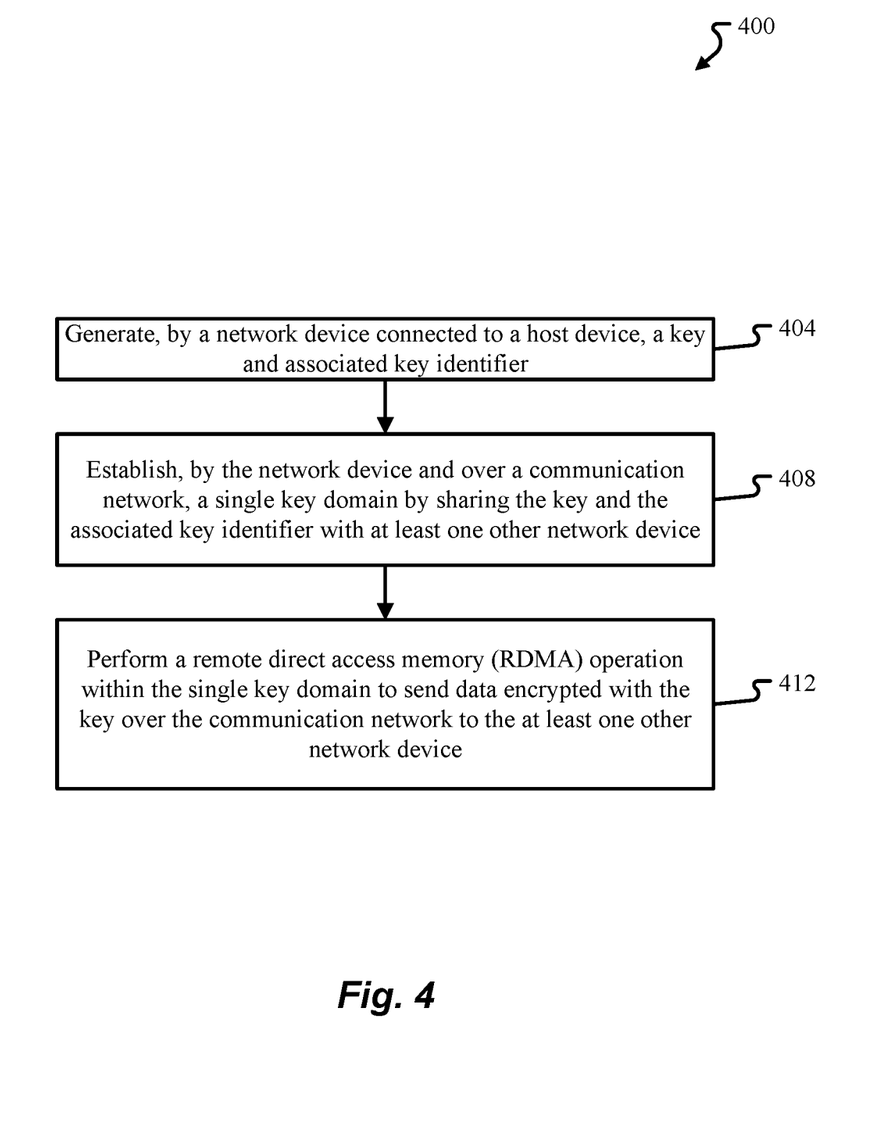
FIG. 4 illustrates a flowchart for a method according to at least one example embodiment.

FIG. 4 illustrates a method 400 according to at least one example embodiment. The method 400 may be carried out by one or more elements shown and described with reference to FIGS. 1-3. The operations of FIG. 4 are described with reference to the host device 104, but the operations of FIG. 4 may be equally carried out on host device 112 or any other host device of the systems 100 and/or 100A. The operations of FIG. 4 may relate to creating a single key domain between endpoints to exchange encrypted data between the endpoints via RDMA operations.

Operation 404 includes generating, by a network device connected to a host device, a key and associated key identifier. In this case, the network device may correspond to a NIC, such as NIC 116, while the host device may correspond to host device 104. The key and associated key identifier may be generated in the same manner as that described above.

Operation 408 includes establishing, by the network device and over a communication network, a single key domain by sharing the key and the associated key identifier with at least one other network device. For example, the NIC 116 establishes a single key domain over communication network 108 in accordance with the operations described above and shares the key and associated key identifier with the NIC 144.

Operation 412 includes performing an RDMA operation within the single key domain to send data encrypted with the key over the communication network 108 to the at least one other network device. For example, as discussed above, host device applications running on host devices 104 and 112 exchange encrypted data via RDMA transfers. Thus, performing the RDMA operation may include forwarding, by the network device, the data encrypted with the key from the memory of the host device to the communication network. It should be appreciated that the data encrypted with the key stored in the memory of the host device remains encrypted with the key as the data travels from the memory through the network device and the communication network to the at least one other network device.

Although not explicitly illustrated, the method 400 may include encrypting the data with the key and storing the encrypted data in memory of the host device (e.g., encrypted memory 128). The method 400 may further include pairing the network device and the host device to enable the network device to generate the key and the associated key identifier.

Notably, throughout methods 300 and 400, the key exchanged between host devices 104 and 112 and that is used to encrypt data of applications running on the host devices is not revealed to the applications, and thus, cannot be read or modified by the applications. This feature is enabled because the distributed root of trust that handles key generation and exchange functions is physically isolated from access by the applications.

Figure 5:
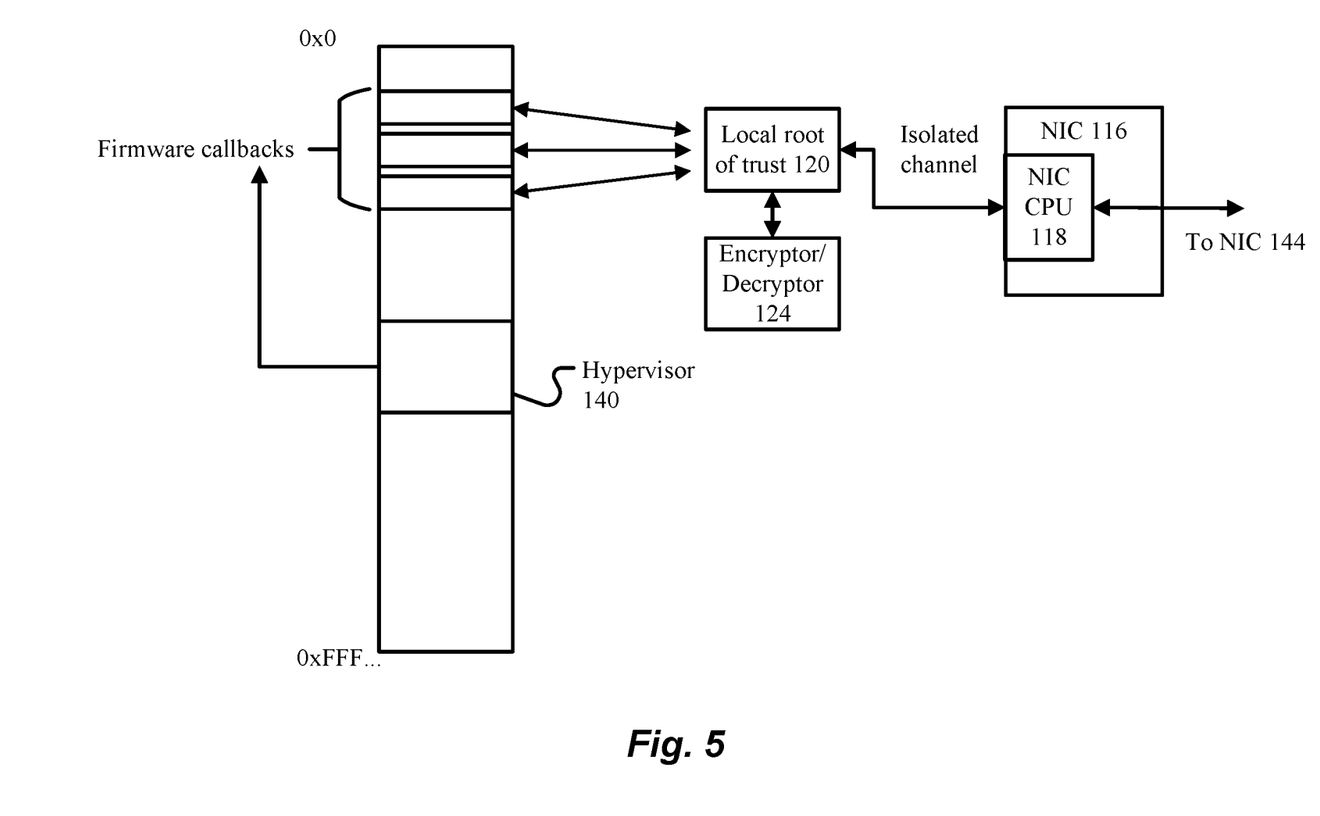
FIG. 5 illustrates a portion of the systems in FIGS. 1 and 2 according to at least one example embodiment.

FIG. 5 illustrates a portion of the systems depicted in FIGS. 1 and 2. In particular, FIG. 5 illustrates a virtual address space for the hypervisor 140 and the local root of trust 120 receiving requests from the hypervisor 140 to set up a single key domain via firmware callbacks. The local root of trust 120 may then authenticate the request and relay the request to the extended root of trust within the NIC 116 via the isolated channel. The extended root of trust within the NIC 116 may use a backend to generate the key and associated key identifier pair and to securely exchange the key (and in some cases the key identifier) with one or more remote endpoints (e.g., host device 112).

In view of FIGS. 1-5, it should be appreciated that example embodiments are directed to a NIC (e.g., NIC 116) including processing circuitry (e.g., CPU 118) configured to pair with a local root of trust (e.g., local root of trust 120) of a host device (e.g., host device 104) connected to the NIC. The processing circuitry is configured to provide a key to an encryption device (e.g., encryptor/decryptor 124) of the host device that enables the encryption device to encrypt data of one or more host device applications using the key. The encrypted data being stored in host device memory (e.g., encrypted memory 128). The processing circuitry is configured share the key with a remote endpoint (e.g., NIC 144 of host device 112), and to forward the encrypted data from the host device memory to the remote endpoint.

As discussed above, the processing circuitry is configured to share the key and a key identifier of the key with the remote endpoint, and after sharing the key and the key identifier with the remote endpoint, the processing circuitry is configured to send the key identifier to a hypervisor (e.g., hypervisor 140) of the host device through the local root of trust for use by the hypervisor when opening the one or more host device applications. The NIC may include a designated channel that enables the processing circuitry to share the key with the remote endpoint. In at least one embodiment, the designated channel is configured for Quantum Key Distribution (QKD). As noted above, the processing circuitry is configured to pair with the local root of trust over an isolated channel between the NIC and the local root of trust. In at least one embodiment, the processing circuitry is configured to pair with the local root of trust based on a root certificate that associates the host device with the NIC. The processing circuitry is configured to share the key in response to a request from a hypervisor (e.g., hypervisor 140) of the host device that passes through the local root of trust (see FIG. 5). In at least one embodiment, the processing circuitry is configured to pair with the local root of trust of the host device upon connection of the NIC to the host device. The processing circuitry may be configured to provide the key to the encryption device through the local root of trust.

At least one example embodiment is directed to a system (e.g., system 100 or system 100A) that includes a first host device (e.g., host device 104) and a first network device (e.g., NIC 116) coupled to the first host device. As discussed above, the first network device enables remote direct access memory (RDMA) operations for exchanging encrypted data over a communication network 108 with a second host device (e.g., host device 112). The encrypted data are encrypted with a single key. The first network device may share the single key and an associated key identifier with the second network device. The encrypted data may belong to multiple applications running on the first host device and the second host device, or may belong to only one application running on the first host device and the second host device. Notably, the encrypted data remains encrypted throughout the RDMA operations.

Example embodiments have been shown and described with respect to RDMA operations of encrypted data between endpoints with the assistance of a smart NIC, but it should be appreciated that example embodiments are applicable to any suitable case where data movement between two endpoint devices is required and both source and destination endpoints are able to operate on encrypted data. That is, example embodiments are not limited to RDMA operations and NICs; other data transfer operations may be employed and suitable peripheral devices other than a NIC (e.g., GPUs, a storage array with an integrated NIC like a network attached storage device, and/or the like) may be used to perform the functions of the NIC described herein.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

Example embodiments may be configured as follows:

(1) A network interface controller (NIC), comprising:
  processing circuitry configured to:
    pair with a local root of trust of a host device connected to the NIC;
    provide a key to an encryption device of the host device that enables the encryption device to encrypt data of one or more host device applications using the key, the encrypted data being stored in host device memory;
    share the key with a remote endpoint; and
    forward the encrypted data from the host device memory to the remote endpoint.

(2) The NIC of (1), wherein the processing circuitry is configured to share the key and a key identifier of the key with the remote endpoint.

(3) The NIC of one or more of (1) to (2), wherein, after sharing the key and the key identifier with the remote endpoint, the processing circuitry is configured to send the key identifier to a hypervisor of the host device through the local root of trust for use by the hypervisor when opening the one or more host device applications.

(4) The NIC of one or more of (1) to (3), further comprising:
  a designated channel that enables the processing circuitry to share the key with the remote endpoint.

(5) The NIC of one or more of (1) to (4), wherein the designated channel is configured for Quantum Key Distribution (QKD).

(6) The NIC of one or more of (1) to (5), wherein the processing circuitry is configured to pair with the local root of trust over an isolated channel.

(7) The NIC of one or more of (1) to (6), wherein the processing circuitry is configured to pair with the local root of trust based on a root certificate that associates the host device with the NIC.

(8) The NIC of one or more of (1) to (7), wherein the processing circuitry is configured to share the key in response to a request from a hypervisor of the host device that passes through the local root of trust.

(9) The NIC of one or more of (1) to (8), wherein the processing circuitry is configured to pair with the local root of trust of the host device upon connection of the NIC to the host device.

(10) The NIC of one or more of (1) to (9), wherein the processing circuitry is configured to provide the key to the encryption device through the local root of trust without the key being accessible to the one or more host device applications.

(11) A method, comprising:
generating, by a network device connected to a host device, a key and associated key identifier;
establishing, by the network device and over a communication network, a single key domain by sharing the key and the associated key identifier with at least one other network device; and
performing a remote direct access memory (RDMA) operation within the single key domain to send data encrypted with the key over the communication network to the at least one other network device.

(12) The method of one or more of (11) to (11), further comprising:
encrypting the data with the key; and
storing the data encrypted with the key in a memory of the host device.

(13) The method of one or more of (11) to (12), wherein performing the RDMA operation includes forwarding, by the network device, the data encrypted with the key from the memory of the host device to the communication network.

(14) The method of one or more of (11) to (13), wherein the data encrypted with the key stored in the memory of the host device remains encrypted with the key as the data travels from the memory through the network device and the communication network to the at least one other network device.

(15) The method of one or more of (11) to (14), wherein the key is shared via quantum key distribution (QKD).

(16) The method of one or more of (11) to (15), further comprising:
pairing the network device and the host device to enable the network device to generate the key and the associated key identifier.

(17) A system, comprising:
a first host device; and
a first network device coupled to the first host device, the first network device enabling remote direct access memory (RDMA) operations for exchanging encrypted data over a communication network with a second host device, wherein the encrypted data are encrypted with a single key.

(18) The system of one or more of (1) to (17), wherein the first network device shares the single key and an associated key identifier with the second network device.

(19) The system of one or more of (1) to (18), wherein the encrypted data belong to multiple applications running on the first host device and the second host device.

(20) The system of one or more of (1) to (19), wherein the encrypted data remains encrypted throughout the RDMA operations.

What is claimed is:

1. A network interface controller (NIC), comprising:
processing circuitry configured to:
pair with a local root of trust of a host device connected to the NIC to enable the NIC to perform a root of trust function on behalf of the local root of trust of the host device, the local root of trust being a hardware-assisted entity that allows running system software to secure an identity of a platform on which the system software is running;
generate a key as the root of trust function performed on behalf of the local root of trust of the host device;
provide, via the local root of trust, the key to an encryption device of the host device to enable encryption of data of one or more host device applications using the key, the encrypted data being stored in host device memory;
share the key with a remote endpoint to enable the remote endpoint to decrypt the encrypted data; and
forward the encrypted data from the host device memory to the remote endpoint.

2. The NIC of claim 1, wherein the processing circuitry is configured to share the key and a key identifier of the key with the remote endpoint.

3. The NIC of claim 2, wherein, after sharing the key and the key identifier with the remote endpoint, the processing circuitry is configured to send the key identifier to a hypervisor of the host device through the local root of trust for use by the hypervisor when opening the one or more host device applications.

4. The NIC of claim 1, further comprising:
a designated channel that enables the processing circuitry to share the key with the remote endpoint.

5. The NIC of claim 4, wherein the designated channel is configured for Quantum Key Distribution (QKD).

6. The NIC of claim 1, wherein the processing circuitry is configured to pair with the local root of trust over an isolated channel.

7. The NIC of claim 1, wherein the processing circuitry is configured to pair with the local root of trust based on a root certificate that associates the host device with the NIC.

8. The NIC of claim 1, wherein the processing circuitry is configured to share the key in response to a request from a hypervisor of the host device that passes through the local root of trust.

9. The NIC of claim 1, wherein the processing circuitry is configured to pair with the local root of trust of the host device upon connection of the NIC to the host device.

10. The NIC of claim 1, wherein the processing circuitry is configured to provide the key to the encryption device through the local root of trust without the key being accessible to the one or more host device applications.

11. A method, comprising:
pairing a network device and a host device to enable the network device to perform a root of trust function on behalf of a root of trust of the host device;
generating, by the network device as the root of trust function performed on behalf of the host device, a key and associated key identifier;
establishing, by the network device and over a communication network, a single key domain by:
providing, through a secure channel that passes through the local root of trust, the key to an encryption device of the host device to enable encryption of data of one or more host device applications using the key;
sharing the key and the associated key identifier with at least one other network device; and
performing a remote direct access memory (RDMA) operation within the single key domain to send the data of the one or more host device applications encrypted with the key over the communication network to the at least one other network device, wherein the at least one other network device uses the key to decrypt the data.

12. The method of claim 11, further comprising:
encrypting the data with the key; and
storing the data encrypted with the key in a memory of the host device.

13. The method of claim 12, wherein performing the RDMA operation includes forwarding, by the network device, the data encrypted with the key from the memory of the host device to the communication network.

14. The method of claim 12, wherein the data encrypted with the key stored in the memory of the host device remains encrypted with the key as the data travels from the memory through the network device and the communication network to the at least one other network device.

15. The method of claim 11, wherein the key is shared via quantum key distribution (QKD).

16. The method of claim 11, wherein the key is provided to the encryption device of the host device through the root of trust of the host device without the key being accessible to the one or more host device applications.

17. A system, comprising:
a first host device; and
a first network device paired with a local root of trust of the first host device to enable the first network device to perform a root of trust function on behalf of the local root of trust of the first host device, the first network device enabling remote direct access memory (RDMA) operations for exchanging encrypted data over a communication network with a second host device, wherein the encrypted data are encrypted with a single key generated by the first network device as the root of trust function performed on behalf of the local root of trust of the first host device and provided by the first network device to the first host device and the second host device so that the first host device uses the single key to encrypt the encrypted data and so that the second host device uses the single key to decrypt the encrypted data, wherein the single key is provided by the first network device to an encryption device of the first host device through a secure channel that passes through the local root of trust of the first host device.

18. The system of claim 17, wherein the first network device shares the single key and an associated key identifier with the second host device.

19. The system of claim 17, wherein the encrypted data belong to multiple applications running on the first host device and the second host device.

20. The system of claim 17, wherein the encrypted data remains encrypted throughout the RDMA operations.

* * * * *